United States Patent
Chessin et al.

(10) Patent No.: US 6,298,479 B1
(45) Date of Patent: *Oct. 2, 2001

(54) METHOD AND SYSTEM FOR COMPILING AND LINKING SOURCE FILES

(75) Inventors: Stephen Alan Chessin, Mountain View; Rodrick Ison Evans, Menlo Park; Michael S. Walker, Los Altos, all of CA (US)

(73) Assignee: Sun Microsystems, Inc., Palo Alto, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/087,352

(22) Filed: May 29, 1998

(51) Int. Cl.$^7$ .................................................. G06F 9/45
(52) U.S. Cl. ............................ 717/10; 717/5; 717/7
(58) Field of Search ................................ 395/710, 707, 395/709; 709/305; 711/147, 209, 213; 712/23, 30; 717/10, 7, 9, 5

(56) References Cited

U.S. PATENT DOCUMENTS

| | | | |
|---|---|---|---|
| 5,165,038 | * 11/1992 | Beard et al. | 711/147 |
| 5,339,428 | * 8/1994 | Burmeister et al. | 717/10 |
| 5,339,431 | 8/1994 | Rupp et al. | 717/10 |
| 5,367,651 | 11/1994 | Smith et al. | 717/9 |
| 5,375,241 | * 12/1994 | Walsh | 709/305 |
| 5,375,242 | 12/1994 | Kumar et al. | 717/7 |
| 5,481,708 | * 1/1996 | Kukol | 717/9 |
| 5,564,031 | * 10/1996 | Amerson et al. | 711/209 |
| 5,613,120 | 3/1997 | Palay et al. | 717/10 |
| 5,630,157 | * 5/1997 | Dwyer, III | 712/23 |
| 5,680,622 | 10/1997 | Even | 717/9 |
| 5,784,630 | * 7/1998 | Saito et al. | 712/30 |
| 5,822,787 | * 10/1998 | Zucker | 711/213 |
| 5,890,000 | * 3/1999 | Aizikowitz et al. | 717/9 |
| 6,026,242 | * 2/2000 | Chessin et al. | 717/9 |

OTHER PUBLICATIONS

Muchnick, Advanced Compiler–design Implementation, 1997, Morgan Kaufmann Publishers, Inc.*

* cited by examiner

*Primary Examiner*—Kakali Chaki
*Assistant Examiner*—Hoang-Vu Antony Nguyen-Ba
(74) *Attorney, Agent, or Firm*—Beyer Weaver & Thomas, LLP

(57) ABSTRACT

A system, method and computer program product for compiling and linking a source file and to generate a symbol table associating a global symbol with a register referenced in the source file. The symbol table enables a linker to initialize the global registers using a relocation entry which holds an initializer. The compiler also generates an object file from the source file. The object file includes the global symbol information. A linker links the object file potentially with at least one other object file or shared library to thereby generate an executable file or shared library. The linker uses the global symbol information contained in the object file to initialize the global registers and to perform relocation operations.

14 Claims, 6 Drawing Sheets

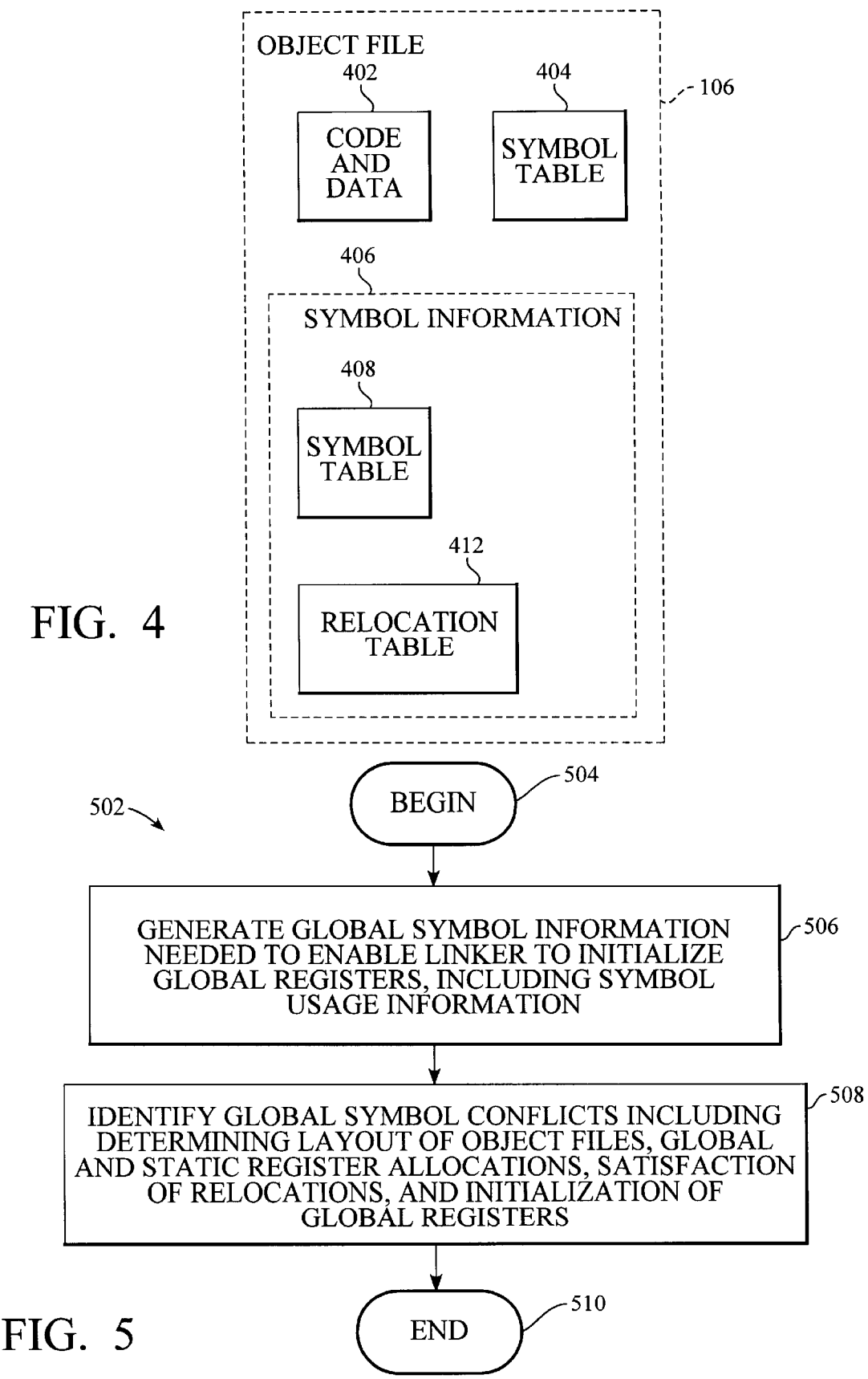

← 408

| SYMBOL TABLE | | | | | | |
|---|---|---|---|---|---|---|
| TYPE | VALUE | NAME | SIZE | BINDING | SECTION INDEX | ← 714 |
| TYPE | VALUE | NAME | SIZE | BINDING | SECTION INDEX | ← 718 |

| RELOCATION TABLE | | | | |
|---|---|---|---|---|
| OFFSET | REGISTER TYPE | SYMBOL | ADDENT | ← 814 |
| OFFSET | REGISTER TYPE | SYMBOL | ADDENT | ← 818 |

FIG. 8

METHOD AND SYSTEM FOR COMPILING AND LINKING SOURCE FILES

RELATED APPLICATIONS

This application is related to commonly-assigned U.S. patent application Ser. Nos. 09/087,344 and 09/087,264, filed on even date hereto, respectively invented by Stephen Chessin; and Stephen Chessin, Rod Evans, and Michael Walker. Each of these related patent applications is hereby expressly referenced, incorporated herein, and made a part hereof.

BACKGROUND OF THE INVENTION

1. Field of the Invention

The field of this invention relates to global register usage and conflict detection systems, methods, and computer program products, and more particularly to the indication of global register usage and the detection of usage conflicts in global registers.

2. Description of the Related Art

In particular computer program systems, registers are used to temporarily hold copies of the contents of variables required by an executing computer program. Persistent values for variables are stored in memory. It is known to be useful, moreover, to designate one or more of the registers in a computer program system as global in scope (that is, used by the entire computer program and not just by particular modules or subroutines) and to dedicate for the use of the global registers certain variables which are also of global scope.

Since particular programs are linked from individual object modules that are each compiled separately, different symbols may refer to the same global register, causing incorrect referencing and scoping of variables. Particular programs furthemore incorporate code from one or more libraries, which is also compiled separately, compounding the misreferencing. A severe technical problem arises when different portions of a particular program each use a single given global register to contain different variable values. Such a usage tends to cause incorrect results because the wrong variable value might be in the global register at the wrong time.

Additionally, another technical problem arises with respect to initializing global values during software operation. While known mechanisms exist for initializing variables in memory to given values before program execution begins, there are no such known mechanisms for initializing a register that is to contain a global variable set to a given value before execution begins.

SUMMARY OF THE INVENTION

According to the present invention, separately compiled software units expressly indicate their global register usage so that static and dynamic linkers are able to detect conflicts of usage incident to compilation. Further according to the present invention, global registers are initialized to desired values before program execution begins. According to one embodiment of the present invention, a symbol table type, STT_SPARC_REGISTER, is established to expressly indicate particular symbol table entries which associate a global symbol with a particular global register. The "name" portion of a symbol table entry points to a string that contains the name of the symbol, or else contains a NULL value to indicate that the register is used for scratch space. The "value" portion of the symbol table entry indicates the particular register to which this entry applies. Another portion of the symbol table entry indicates whether there is an initializer for the particular register. According to another embodiment of the present invention, a relocation type, R_SPARC_REGISTER, indicates an initial value for a global register.

According to the present invention, a compiler generates symbol table entries to indicate how a containing object file uses the application-reserved global registers. A static linker checks the generated symbol table entries for all object files being combined into a particular target object file to ensure that the global registers referenced by the different source elements arc used compatibly. The resulting object file produced includes these symbol table entries to indicate the resulting object global register usage. According to the present invention, the static linker warns if any shared object file that was referenced during the linking used the global registers in a fashion incompatible with the object file being built. According to the present invention, the static linker generates a warning, if a shared object file is being built that uses application-reserved global registers. A similar warning is issued according to the present invention by an archiver, if an archive library is built using application-reserved global registers. A dynamic linker according to the present invention checks to ensure that all object files being bound into a selected process have compatible uses of application-reserved global registers.

According to the present invention, a system and method for compiling and linking a source file includes a compiler for generating a symbol table which associates particular global symbols with corresponding global registers for holding variable class information pertaining to global symbols referenced or defined in the source file. The symbol table information is sufficient to enable a linker to resolve class definitions and to perform class relocation operations. The symbol table information is included in the object file generated by the compiler. The compiler particularly generates object files such that identification of usage conflicts and performance of relocation operations are delayed until operation of the linker. A linker links the object file with other object files and shared libraries to thereby generate either an executable file or a shared library. The list of other object files and shared libraries may be empty, in which case the linker generates the executable file or shared library from the single object file. The linker uses the class information contained in the object file to identify usage conflicts and to perform relocation operations.

BRIEF DESCRIPTION OF THE DRAWINGS

FIG. 4 is a block diagram of an object file produced by a compiler according to a preferred embodiment of the present invention;

FIG. 5 is a flowchart of a compilation/linking process according to a preferred embodiment of the present invention;

FIG. 7 is an example of an information table generated by a compiler according to a preferred embodiment of the present invention; and FIG. 8 is an example of a relocation table according to one embodiment of the present invention.

DETAILED DESCRIPTION OF THE PREFERRED EMBODIMENT

Figure 1:
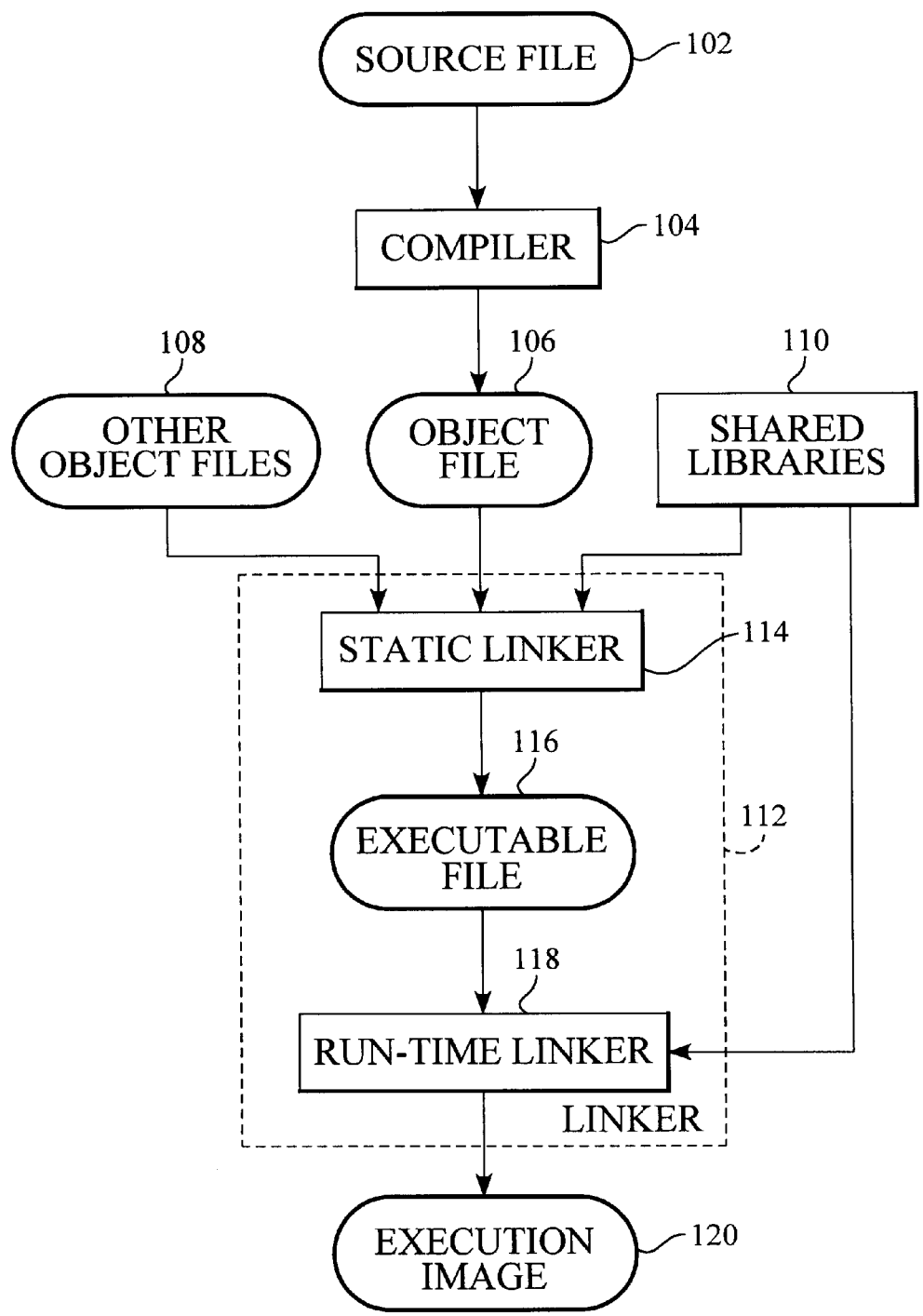
FIG. 1 is a compilation data flow diagram according to a preferred embodiment of the present invention.

FIG. 1 is a compilation data flow diagram according to a preferred embodiment of the present invention. In particular, FIG. 1 illustrates a compiler 104, a static linker 114, and a run-time linker 118, according to one implementation of the present invention. The compiler 104 generates an object file 106 from a source file 102. The source file 102 is written according to different embodiments of the present invention in the well-known C, C++, or the Fortran computer programming languages. It is important to note that the present invention does not impose restrictions on how developers may use the particular language selected to produce the source file 102. According to one embodiment of the present invention, the static linker 114 includes a relocation code section which is used to initialize register symbols. The relocation code section has a name,. rela; a type, SHT_RELA; and no attributes, Accordingly, the following table is valid:

TABLE A

Matrix of Legal Combinations of Usage of a Given Register

| Name | Type | Attributes |
| --- | --- | --- |
| .rela | SHT_RELA | None |

.rela  sh_link contains the section header index of the associated symbol table; and sh_info is 0, indicating that this section only contains register relocations.

Figure 2:
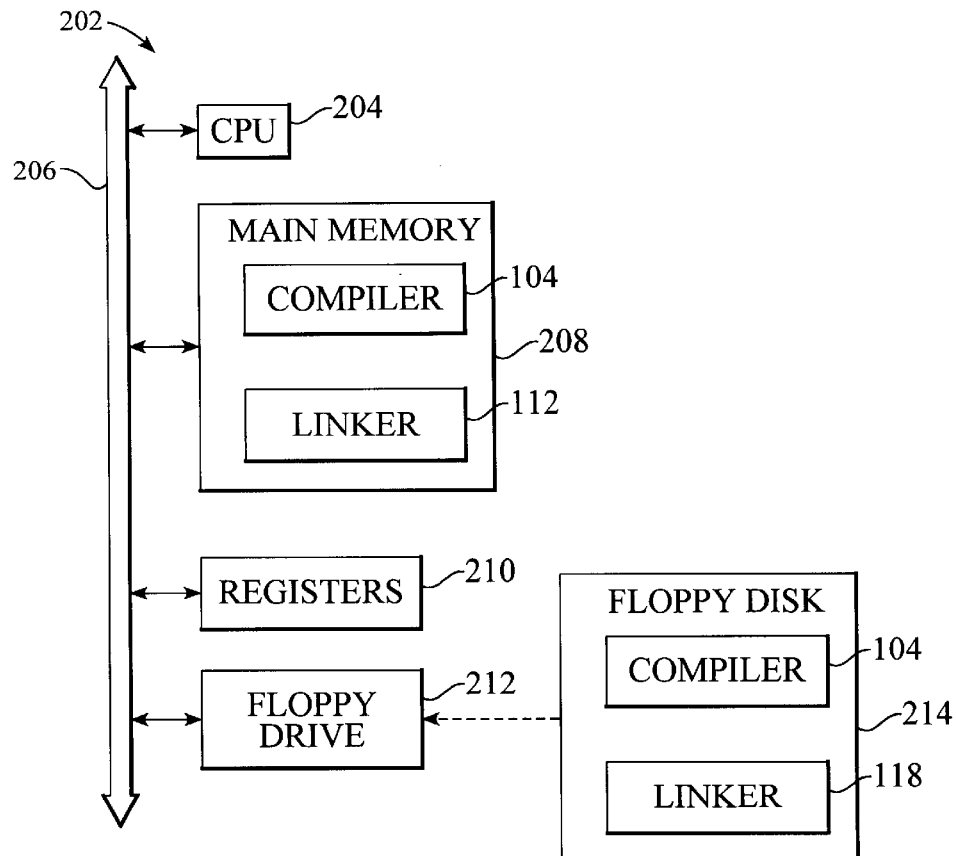
FIG. 2 is a block diagram of a computer system according to a preferred embodiment of the present invention.

The object file 106, as well as zero or more other object files 108, and/or zero or more shared libraries 110 are transferred to a static linker 114, according to the present invention. The other object files 108 were previously compiled by the compiler 104 of the present invention and the shared libraries 110 were previously created by the static linker 114. The static linker 114 generates an executable file 116. According to one embodiment of the present invention, the static linker 114 generates another shared library. As will be appreciated, a shared library is a form of an object file. Accordingly, the terms "object file" and "shared library" will be used interchangeably herein. As will be appreciated by persons skilled in the art, the executable file 116 includes code, data, and other information from the object files 106, 108, and also contains references to shared libraries 110 (i.e., code, data, etc. from the shared libraries 110 are not actually embedded in the executable file 116. During run-time, the executable file 116 and the shared libraries 110 are transferred to a run-time linker 118. The run-time linker 118 resolves references contained in the executable file 116 to the shared libraries 110, and produces an execution image 120. The execution image 120 is stored in main memory 208 and is executed by a central processing unit 204 (FIG. 2). Generally speaking, the operation of the static linker 114 and run-time linker 118 may be broken down into four phases as shown in detail in FIGS. 3A and 3B.

FIG. 2 is a block diagram of a computer system 202 according to a preferred embodiment of the present invention. The computer system 202 includes one or more processors, such as central processing unit (CPU) 204, connected to a communication medium, such as a bus 206. A main memory (e.g., without limitation) random access memory (RAM)) 208 is also connected to the bus 206. The compiler 104 and linker 112 are stored in the main memory 208. Linker 112 includes according to the present invention a static linker 114, a run-time or dynamic linker, or both. The source file 102; object files 106 and 108; shared libraries 110; and the execution image 120 are also preferably stored in the main memory 208. Computer system 202 further includes registers 210. A computer program product (such as floppy disk 214), comprising a computer readable media having computer program logic recorded thereon, wherein the computer logic when executed in the computer system 202 enables the computer system 202 to perform the functions of the present invention, may be read by an additional storage device, such as floppy disk drive 212. The computer program logic, which represents the compiler 104 and the linker 112, may then be loaded into the main memory 208 (as shown), and executed by the CPU 204. A suitable form for the computer system 202 is a Sun Microsystems workstation made by Sun Microsystems, Inc., of Mountain View, Calif. Any other suitable computer system could alternatively be used.

Figure 3A:
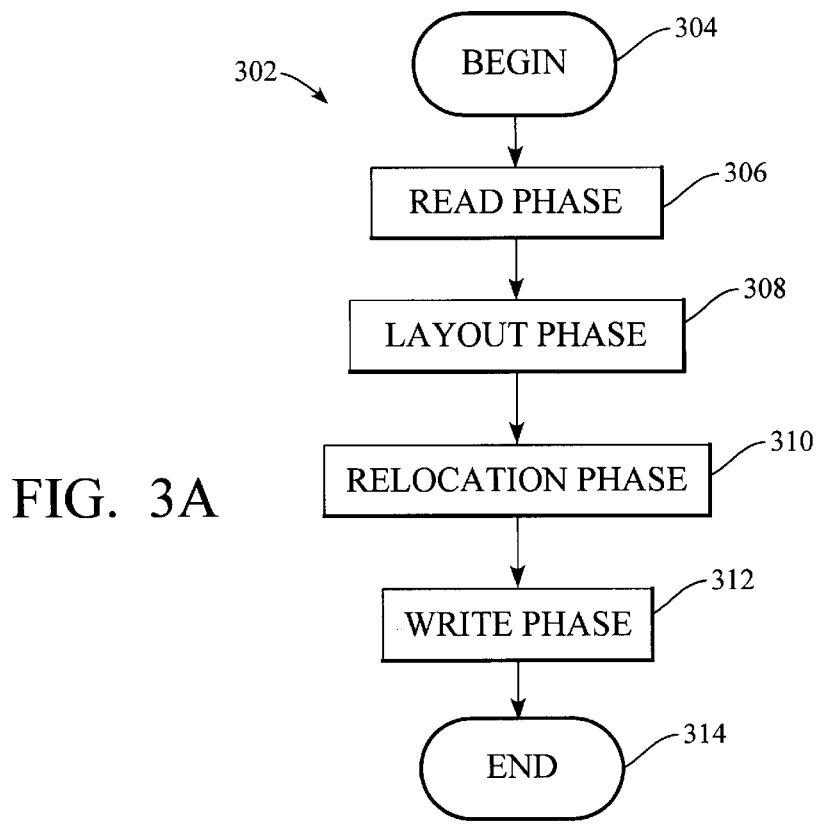
FIG. 3A is a flowchart of a linker process which can be used in connection with the present invention.

FIG. 3A is a flowchart of a linker process which can be used in connection with the present invention. Flowchart 302 particularly shows performance 306 of a read phase in which the static linker 114 and run-time linker 118 operate to perform read operations after a begin phase 304, a layout phase 308, a relocation phase 310, and a write phase 312. These linker phases 306, 308, 310, and 312 are well-known to persons skilled in the art. Flowchart 302 is completed with performance of an end phase 314.

Figure 3B:
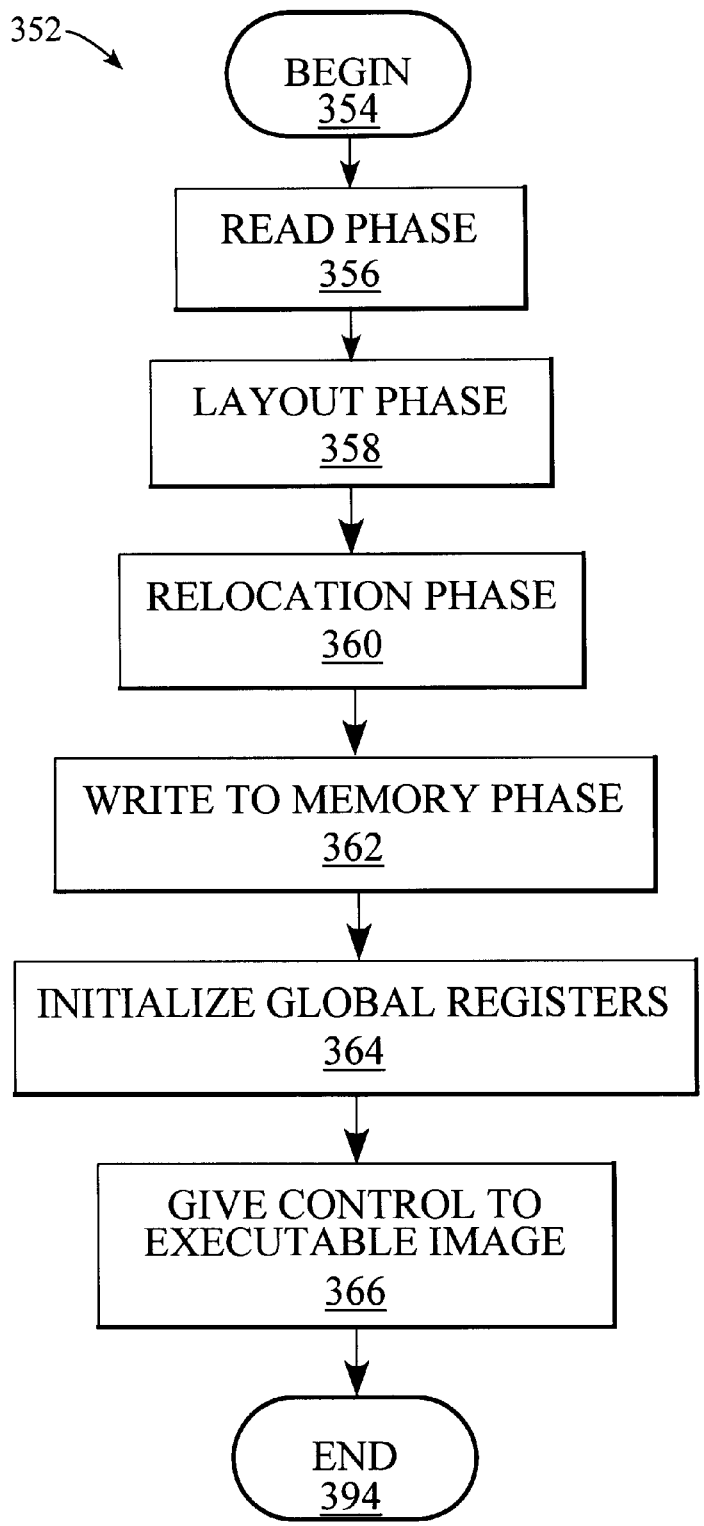
FIG. 3B is a flow chart of a linker process according to one embodiment of the present invention.

FIG. 3B is a flowchart 352 of a linker process according to one embodiment of the present invention. In particular, after completion of a begin phase 354, a read phase is performed 356 in which the static linker 114 and the run-time linker 118 operate to perform read operations. Thereafter, a layout phase 358 is performed, which is followed by a relocation phase 360 and a write to memory phase 362. Thereafter according to the present invention, the global registers are initialized and control is turned over 366 to the executable image, followed by completion in an end phase 394.

FIG. 4 is a block diagram of an object file produced by a compiler according to a preferred embodiment of the present invention. As shown in FIG. 4, the object file 106 includes code and data 402 and a symbol information 406. According to one embodiment of the present invention, object file 106 additionally includes one or the other or both of symbol table 404 and symbol table 408. The symbol information 406 according to one embodiment of the present invention includes a symbol table 408. Further according to one embodiment of the present invention, the symbol information 406 includes a relocation table 412. The compiler 104 generates code and data 402 and information for the symbol table 408 including global symbol and global register information and embeds such information 406 in the object file 106. Such global symbol and global register information includes data about global symbols and global registers which are defined and/or referenced in the source file 102, and further includes additional information on how such global symbols and global registers are used by the source file 102. The global symbol and global register information 406 generated by the compiler 104 particularly enables the linker 112 whether static, dynamic or run-time, to identify global symbol conflicts and global register conflicts and to perform relocations according to the present invention.

As discussed above, it is not the compiler 104 that identifies global symbol conflicts or perform relocations according to the present invention. Instead, identification of global symbol conflicts is delayed from compile time to link time according to the present invention. In particular according to FIG. 5, the compiler 104 is used to generate information about global symbols and how they are used, according to step 506 which follows a begin phase 504. Such information about global symbol conflicts is called symbol information 406, and is embedded in the object file 106 which is produced by the compiler 104. More particularly, FIG. 5 is a flowchart of a compilation/linking process according to a preferred embodiment of the present invention. In particular, FIG. 5 depicts a flowchart 502 according to the present invention which represents the high-level operation of the compiler 104 and the applicable one of linkers 114, 118. The compiler 104 performs step 506 when compiling the source file 104, and the applicable one of linkers 114, 118 performs step 508 when processing the object files 106 and 108, and the shared libraries 10. Flowchart 502 begins with step 504 and control passes to step 506 after completion of the begin phase. The compiler generates information regarding global symbol table entries to indicate how the containing object file uses particular application-reserved global registers. The programmer accordingly indicates to the compiler by flags, for example, according to one embodiment of the present invention, or to the assembler by flags or directives according to another embodiment of the present invention, what the particular register usage is for a selected global register. According to step 506, the compiler 104 generates an object file 106 from the source file 102. In step 508, the applicable one of linkers 114, 118 generates an executable file 116, and then an execution image 120 is produced from the object files 106 and 108, and the shared libraries 110. As discussed above, during the generation of the executable file 116 and the execution image 120, the static linker 114 and the run-time linker 118 perform a read phase 306, a layout phase 308, a relocation phase 310, and a write phase 312. According to the present invention, these linker phases 306, 308, 310, and 312 are modified such that the static linker 114 and the run-time linker 118 identify global symbol conflicts and perform relocations. The operation of the static linker 114 and the run-time linker 118 is further discussed below. After step 508 is fully performed, the operation of flowchart 502 is complete, as indicated by step 510. The static linker checks the symbol table entries in the object files being combined into an executable file or a shared library to ensure that the global registers are used compatibly. The resulting object includes, according to the present invention, entries in its symbol table to indicate the resulting object's global register usage. The static linker warns if any shared library that was referenced during the linking uses global registers incompatibly with the object being built. Further according to one embodiment of the present invention, the static linker generates a warning if a shared object is being built that uses application-reserved global registers. A similar warning is issued by an archiver, if an archive library is built containing objects that use application-reserved global registers. The dynamic linker (ld.so) according to the present invention checks that all object files being bound into a target process have compatible uses of the application-reserved global registers. A dlopen( ) of an object that is not compatible with the particular selected application process, for example, fails with an error according to the present invention.

TABLE B

Matrix of Usage Combinations for a Given Register

| Obj1\Obj2 | Unused | Scratch | Symbol |
| --- | --- | --- | --- |
| Unused | OK | OK | OK |
| Scratch | OK | OK | NO |
| Symbol | OK | NO | * |

*OK is used if the symbols are identical; NO is used if they are not identical. Two symbols are identical if and only if one of the following is true:
A. They are both global and have the same name.
B. They are both local, have the same name, and are defined in the same object.

The scratch symbol according to the present invention is treated as a symbol since a null name only matches a null name and scratch registers according to the present invention have global scope. A matrix of permissible combinations of st_shndx for the same register symbol follows:

TABLE C

Matrix of Permissible Combinations of Initialization of a Given Register

| Obj1\Obj2 | UNDEF | ABS |
| --- | --- | --- |
| UNDEF | OK | OK |
| ABS | OK | NO |

The symbol information 406 according to one embodiment of the present invention includes (1) a symbol table 408 containing a list of global symbols; and (2) a relocation table 412 containing a list of global symbols. Using the symbol information 406, the linker 114 or 118 as applicable, in step 508 determines the exact layout of global symbol used by an application and then satisfies the relocations required. The symbol table 408 comprises a plurality of entries, where each entry corresponds to a symbol. These entries are used by the linkers 114 and 118 during the relocation process.

Figure 6:
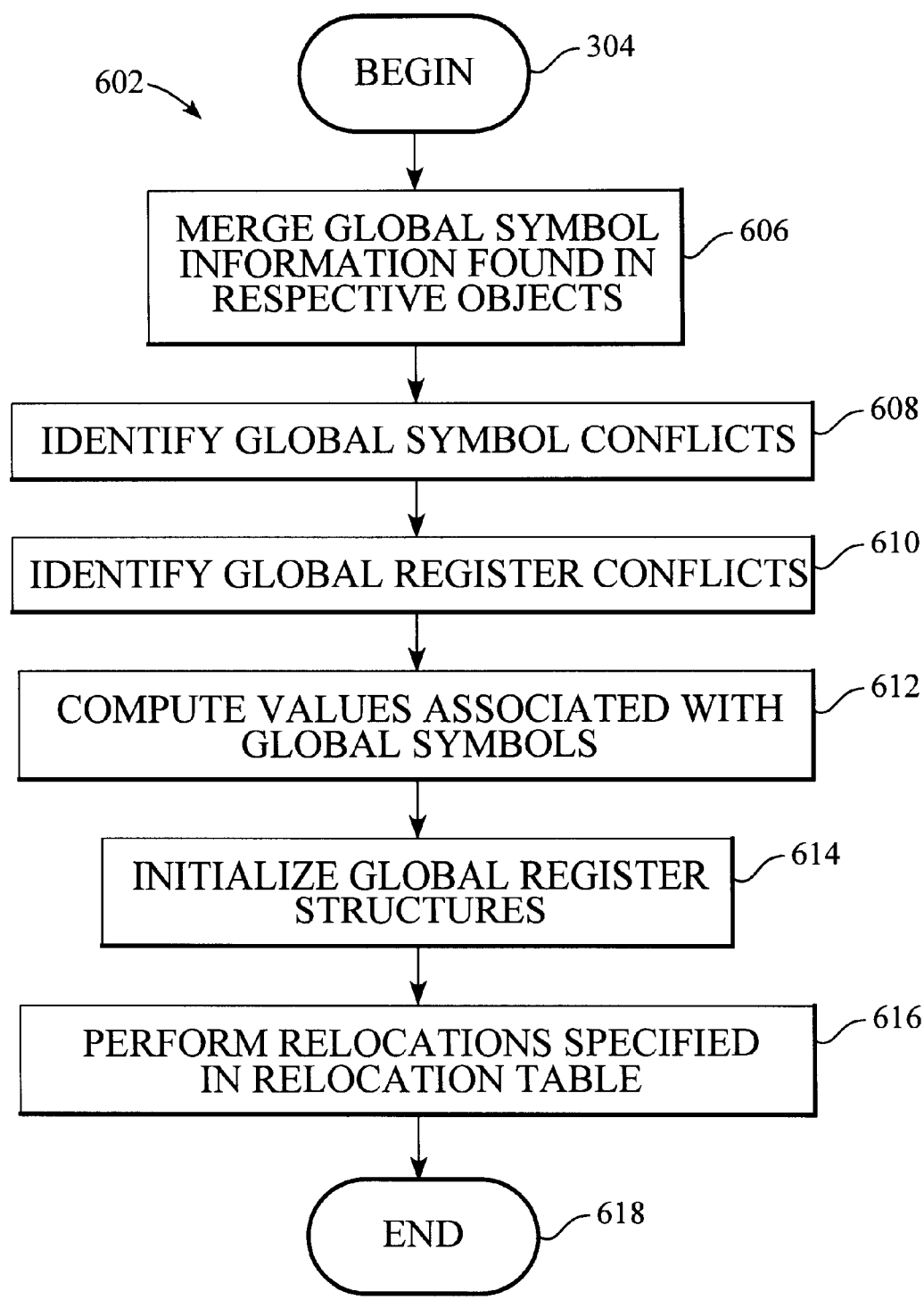
FIG. 6 is a detailed flowchart of link processing according to a preferred embodiment of the present invention.

FIG. 6 is a detailed flowchart of linker operation according to one embodiment of the present invention. A linker generally operates according to four phases: a read phase 306, a layout phase 308, a relocation phase 310, and a write phase 312 (FIG. 3). In the present invention, these linker phases 306, 308, 310, and 312 have been modified such that the applicable linker identifies global symbol conflicts. Such modification is shown in a flowchart 602 in FIG. 6. In particular, step 606 is preferably performed in the read phase 306. Step 608 is preferably performed between the read phase 306 and the layout phase 308. According to step 610, global symbol conflicts are identified Steps 612 and 614 are preferably performed between the layout phase 308 and the relocation phase 310. Step 616 is preferably performed during the relocation phase 310. Flowchart 602 shall now be described. Flowchart 602 begins with step 604, where control immediately passes to step 606. In step 606, the applicable linker reads in the object files 106, 108 and the shared libraries 110 and merges together the global symbol information 406 contained in these files. In particular, the applicable linker merges together the global symbol tables 408 contained in these files to generate a merged symbol table. Similarly, the applicable linker merges together the relocation tables 412 to generate a merged relocation table. In step 608, the applicable linker identifies global symbol conflicts. In particular, the applicable linker processes the merged tables and determines the layout of each symbol (for example, the size and alignment of each symbol, the number of fields, the data types of the fields, the number of bytes from the top of the symbol to each of the fields, etc.) The applicable linker creates a separate data structure for each symbol, and stores this symbol specific information in such data structures. These data structures are called "layout data structures" for reference purposes. Upon the completion of step 608, the applicable linker is aware of all symbol-related information that are conventionally known by conventional compilers. In step 612, the applicable linker evaluates the symbols in the merged symbol table. In particular, the applicable linker determines the value of the symbol in each entry of the merged symbol table, and stores this value in the value field of this entry. Consider, for example, the example symbol table 408 in FIG. 7. The applicable linker determines the values of entries 714 and 718 by referencing the appropriate layout data structure for a particular class. The applicable linker stores these values in the value fields of these entries 714, 718. The manner in which the linker 112 calculates the values of other symbol types is described above. In step 614, the applicable linker initializes global register structures. In particular, during step 614 the applicable linker generates tables and table pointer information tables, and stores these tables in the appropriate data structures that have been allocated. In step 616, the applicable linker performs the relocations specified in the entries of the merged relocation table. The manner in which the applicable linker performs this function is described above. After step 616 is fully performed, the operation of flowchart 602 is complete, as indicated by step 618. As will be appreciated by persons skilled in the relevant art, the operation of the applicable linker described above is, in practice, collectively performed by the static linker 114 and the run-time linker 118. Whether the operations described above are performed by the static linker 114 or the run-time linker 118 is not important in the present invention. Preferably, however, the static linker 114 attempts to prelink executables and shared objects so that if the executable and shared objects are in the same state as when they were created, then the run-time linker 118 needs to only load the files and start running. In practice, the run-time linker 118 may have to redo many of the relocations that were done by the static linker 114.

FIG. 7 is an example of a symbol table generated by a compiler according to a preferred embodiment of the present invention. FIG. 7 particularly shows first and second symbol table entries, 714 and 718, in an example symbol table 408. Each entry in the symbol table 408 includes information that identifies the symbol type, and information that indicates the value of the symbol for this class. Entries for particular symbols may additionally include further fields including for example symbol name, symbol size, symbol binding, and a symbol section index. The symbol name when appropriate contains the name of a member. The list of symbol types is implementation specific, and depends on a number of factors, such as the computer programming language and the target machine. Example symbol types will be apparent to persons skilled in the relevant art.

As described below, the applicable linker calculates the values of the symbols in the symbol table 408 according to the present invention before processing the relocation entries in the relocation table 412. In processing each relocation entry, the value is extracted from the symbol table and is stored at the given address according to the type of the relocation entry. Consider the example of FIG. 7. Prior to processing the relocation entries in the relocation table 412, the applicable linker evaluates the symbol entries 714, 718 in the symbol table 408 and reads the value associated with each symbol entry. The applicable linker then inserts the value read into the value field of the symbol entry 714. According to one embodiment of the present invention, the applicable linker inserts this value (8 bytes) into the value field of the symbol entry 718. While processing a particular relocation entry, the applicable linker according to the present invention replaces a placeholder in the instruction at a particular address with the value in symbol entry 714. This may be a case pointer in a relocation entry which points to symbol entry 714. Similarly, while processing a particular relocation entry for relocation table 412, the applicable linker replaces the placeholder, such as a zero (i.e., "o" for example) in the instruction at a particular address with the value provided in symbol entry 714. A register symbol in a symbol table according to one embodiment of the present invention is indicated by a specific additional Symbol Type and Value as set forth below:

TABLE D

Additional Symbol Table Type

| Name | Value |
|---|---|
| STT_REGISTER | 13 |

A symbol table entry for a register symbol according to one embodiment of the present invention particularly includes the following elements:

| | |
|---|---|
| st_name | Index into the string table of the name of the symbol. An index value of 0, which points to the null name in the string table, indicates that the register is used for scratch. A scratch register must have binding STB_GLOBAL. |
| st_value | Register number. Register numbers correspond to the assignments in the SPARC Architecture Manual for integer registers. |
| st_size | unused (0) |
| st_info | ELF64_ST_INFO (bind.type) bind is typically STB_GLOBAL, but does reflect the actual declared scope of the name (that is, it could be STB_WEAK or STB_LOCAL). type must be STT_REGISTER (13) |
| st_other | unused (0) |
| st_shndx | SHN_ABS if this object initializes this register symbol; SHN_UNDEF otherwise. An initializer for a SHN_ABS register symbol is specified with a special register relocation type. |

Absence of an entry for a particular global register indicates that that particular global register is not used by the object. An object according to the present invention uses one or more of the application-reserved global registers and indicates this usage with an appropriate symbol-table entry. The following dynamic array tag is moreover added to the symbol table according to one embodiment of the present invention:

TABLE E

Symbol Table Dynamic Array Tags

| Name | Value | d_un | Executable | Shared Object |
|---|---|---|---|---|
| DT_REGISTER | 0x7000001 | d_val | optional | optional |
| DT_REGISTER | This element contains the index of an STT_REGISTER symbol. There is one of these entries for every STT_REGISTER symbol table entry in the symbol table. | | | |

The compiler 104 according to the present invention accordingly generates code that is relocated at link-time. In particular, if a variable is referenced in a source file, the compiler 104 generates both a symbol table 408 and a relocation table 412. According to one embodiment of the present invention, the generation of symbol and relocation tables is accomplished with a specialized global register relocation type which is used to identify global register conflicts and to initialize the global registers prior to execution of the execution image which is produced.

FIG. 8 is an example of a relocation table according to one embodiment of the present invention. The relocation table 412 contains a list of the relocations which must be performed by the applicable linker during link-time. Each entry in the relocation table 412 includes a relocation type, an address of either an instruction or a data element that needs to be relocated, and, in all but one case, a pointer to an entry in the symbol table 408. The following relocation type is added to the relocation table according to the present invention:

TABLE F

Additional Relocation Type

| Name | Value | Field | Calculation |
| --- | --- | --- | --- |
| R_SPARC_REGISTER | 54 | V-xword64 | S + A |
| R_SPARC_REGISTER | This relocation type is used to initialize a register symbol. Its offset member contains the register number to be initialized. There must be a corresponding register symbol for this register of type SHN_ABS. | | |

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of compiling and linking a source file, the method comprising:

generating, using a compiler, global variable information pertaining to at least one global variable referenced in a source file;

generating, using the compiler, a first object file from the source file, where the object file includes the global variable information;

linking the first object file with a second object file to generate an executable file;

generating, during the linking process, a composite symbol table having a symbol entry for each global variable in the linked object files;

examining, during the linking process, the composite symbol table and determining if at least one variable conflict occurs;

generating, during or after the linking process, a composite relocation table having at least one relocation entry for resolving at least one variable conflict determined during examination of the composite symbol table; and performing, during or after the linking process, a relocation operation according to at least one relocation entry in the composite relocation table.

2. The method of claim 1, further comprising initializing, during said linking process, at least one global register for said at least one global variable.

3. The method of claim 2, further comprising initializing said at least one global register to a desired initial value before execution of said object file.

4. The method of claim 1, further comprising providing an incompatibility indication, during said linking process, when said first object file uses at least one of said global registers in a manner that is incompatible with said second object file.

5. The method of claim 1, further comprising:

providing an archiver to construct an archive library; and providing a reservation indication, during said linking process, when the archive library being constructed uses at least one application-reserved global register.

6. The method of claim 1, further comprising identifying at least one usage conflict and performing said relocation operation after said linking process is completed.

7. The method of claim 1, further comprising calculating, using said linker, at least one value of a symbol in a symbol table before performing said relocation operation.

8. A system for compiling and linking a source file, the system comprising:

a compiler having a first compiler mechanism for generating global variable information pertaining to global variables referenced in a source file, and having a second compiler mechanism for producing a an object file, which contains the global variable information, from the source file; and a linker mechanism for linking the object file with another object file to generate a combined executable file, the linker mechanism further comprising:

a first mechanism for generating a composite symbol table having a symbol entry for at least one global variable in the linked object files;

a second mechanism for examining the composite symbol table and for determining if at least one variable conflict occurs;

third mechanism for generating a composite relocation table for resolving at least one global variable conflict that is detected; and a fourth linker mechanism for performing at least one relocation operation according to the relocation entries in the composite relocation table.

9. The system of claim 8, wherein said linker further comprises a register initialization mechanism for initializing at least one global register for said at least one global variable before performance of said at least one relocation operation.

10. The system of claim 8, wherein said linker mechanism further comprises:

a table entry mechanism for computing at least one value associated with said symbol entries in said composite symbol table; and an initial value mechanism for initializing at least one global register for said at least one global variable to a desired initial value in accordance with at least one computed value associated with said symbol entries.

11. The system of claim 8, wherein said linker mechanism further comprises an incompatibility mechanism for indicating, during said linking process, when said first object file uses at least one of said global registers in a manner that is incompatible with said second object file.

12. The system of claim 8, wherein said compiler further comprises an archiver to construct an archive library and to provide a reservation indication, during said linking process, when the archive library being constructed uses at least one application-reserved global register.

13. The system of claim 8, wherein at least one of said compiler and said linker mechanism identifies at least one usage conflict and performs said relocation operation after said linking process is completed.

14. The system of claim 8, wherein said linker calculates at least one value of a symbol in said composite symbol table before performing said at least one relocation operation.

* * * * *